United States Patent
Gibbs et al.

(10) Patent No.: US 6,856,864 B1
(45) Date of Patent: Feb. 15, 2005

(54) METHOD AND SYSTEM FOR ENTERING DATA WITHIN A FLIGHT PLAN ENTRY FIELD

(75) Inventors: Michael J. Gibbs, Phoenix, AZ (US); Debi Van Omen, Scottsdale, AZ (US); Michael B. Adams, Scottsdale, AZ (US); Karl L. Chase, Glendale, AZ (US); Daniel E. Lewis, Glendale, AZ (US); Daniel E. McCrobie, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 315 days.

(21) Appl. No.: 09/715,308

(22) Filed: Nov. 17, 2000

(51) Int. Cl.$^7$ ................................................ G05D 1/00
(52) U.S. Cl. ........................ 701/3; 701/14; 701/16; 340/995
(58) Field of Search .......................... 701/3, 14, 16, 701/23, 25, 26, 122, 201, 204, 210; 340/995, 979; 342/33; 244/183

(56) References Cited

U.S. PATENT DOCUMENTS

| | | | | |
|---|---|---|---|---|
| 4,692,869 A | * | 9/1987 | King et al. | 701/206 |
| 5,398,186 A | * | 3/1995 | Nakhla | 701/16 |
| 5,416,705 A | * | 5/1995 | Barnett | 701/14 |
| 5,526,265 A | * | 6/1996 | Nakhla | 701/16 |
| 5,842,142 A | * | 11/1998 | Murray et al. | 701/16 |
| 5,844,503 A | * | 12/1998 | Riley et al. | 340/945 |
| 6,112,141 A | | 8/2000 | Briffe et al. | |

FOREIGN PATENT DOCUMENTS

EP  0743580 A  11/1996

* cited by examiner

*Primary Examiner*—Marthe Y. Marc-Coleman

(57) ABSTRACT

The present invention provides systems, apparatus and methods for entering data into a flight plan entry field which facilitates the display and editing of aircraft flight-plan data. In one embodiment, the present invention provides a method for entering multiple waypoint and procedure identifiers at once within a single a flight plan entry field. In another embodiment, the present invention provides for the partial entry of any waypoint or procedure identifiers, and thereafter relating the identifiers with an aircraft's flight management system to anticipate the complete text entry for display. In yet another embodiment, the present invention discloses a method to automatically provide the aircraft operator with selectable prioritized arrival and approach routing identifiers by a single manual selection. In another embodiment, the present invention is a method for providing the aircraft operator with selectable alternate patterns to a new runway.

17 Claims, 5 Drawing Sheets

METHOD AND SYSTEM FOR ENTERING DATA WITHIN A FLIGHT PLAN ENTRY FIELD

The invention described herein was made in the performance of work under NASA Contract No. NAS1-20219, TASK 10 and is subject to the provisions of Section 305 of the National Aeronautics and Space Act of 1958 (42 U.S.C. § 2457). The government may have rights to portions of this invention.

FIELD OF THE INVENTION

The present invention relates to vehicle navigation, and more particularly, to methods for entering data within a flight plan entry field within an aircraft avionics system.

BACKGROUND OF THE INVENTION

Aircraft flight displays continue to advance in sophistication, achieving increasingly higher levels of information density and, consequently, presenting a greater amount of visual information to be perceived and understood by the operator. In many situations, it is important that visual displays provide a proper cognitive mapping between what the operator is trying to achieve and the information available to accomplish the task. As a result, such systems increasingly utilize human-factor design principles in order to build instrumentation and controls that work cooperatively with human operators as efficiently as possible.

One area in particular that has not profited in advances is the field of aircraft flight management systems (FMS). Specifically, in current generation aircraft, flight plan entry and editing continues to be performed using cumbersome, manual entry text-based techniques which have not changed significantly in the decade. As a result, flight crews frequently complain that current flight management systems are non-intuitive, require too much information entry, are difficult to interpret and require too much heads-down time due in part to the awkward methods available for data entry and positioning of instrumentation.

For example, in current generation aircraft, flight management systems require a user to use a manual entry methodology based on the entry of text on a keypad and entering the text identifiers into the FMS by selecting line select keys that surround the display area (such as seen in FIG. 1). Thus, for example, a waypoint is manually entered into a keypad entry area or scratchpad 4 on a key pad (not shown in FIG. 1), and then a line select key 16 is selected to enter the contents of the scratchpad into the corresponding field (see FIG. 1) on a display 14. In the current systems, such manual entries are made in different areas or fields on the display 14. For example, in a typical control and display unit (CDU) or multifunction CDU (MCDU) as depicted in FIG. 1, if the air traffic controller requires the operator of the aircraft in an airway routing to follow airway J102 between location ZUN and location GOSIP, the specific text ZUN must be manually typed on a key pad and entered in the display field on the right at the $4^{th}$ line select key (4R), the text J102 must by typed on a key pad and entered in the display field adjacent to 5L, and the text GOSIP must be typed on a key pad and entered in the display field 5R. Text entry is tedious because the pilot must stop typing, look at the display and decide where each entry goes before the next item can be entered. Moreover, the key pads do not follow a standard QWERTY key pattern, thereby making it difficult to quickly manually enter text. If a mistake is made, the system displays an error message in the scratchpad (such as, for example, "INVALID ENTRY"). In this event, the scratchpad 14 must be cleared manually before the entry can be re-entered.

As stated previously, flight crews often complain that such manual text entry for any component within an aircraft's FMS is difficult, cumbersome, requires too much heads-down tim and is often difficult to predict the outcome of such text entry. Moreover, the problems associated with such manual text entry are exacerbated for short flight periods, for aircraft which travel at much higher speeds (such as supersonic aircraft) and for those aircraft having a limited crew to fly the aircraft In some situations the crew abandons use of the FMS because the cockpit workload is too high to allow for reprogramming the system. In such cases, the pilots decide to fly the airplane using the aircraft's autopilot function.

Methods are therefore needed in order to overcome these and other limitations of the prior art. What is needed is a method for reducing crew workload by providing an efficient, easy and quick method for entering text within a FMS flight path plan. What is also needed is a method which provides an aircraft operator with alternate selection of aircraft approach and arrival procedures. Methods such as those disclosed in the present invention would provide lower initial and recurring costs and further provide greater safety to the occupants of the aircraft.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

In one embodiment, the present invention provides systems and methods for a method for entering data into a flight plan entry field which facilitates the display and editing of aircraft flight-plan data. In accordance with various aspects of the present invention, a user (e.g., a pilot) located within the aircraft provides input to a processor through a text entry device and receives visual feedback via a display produced by a monitor. The display includes various textual identifiers associated with routing information such as airways, waypoints and procedures. Through use of the text entry device, the user may modify the flight-plan in accordance with feedback provided by the display.

The present invention provides a method for quick and easy entry and editing of data of flight plan data within a flight plan entry field. The present invention augments graphical flight planning on displays with an orthogonal set of optimized flight plan entry features while minimizing keystrokes on older flight decks which still use CDU or MCDU flight management systems, while still allowing for implementation in newer graphically oriented systems.

In another embodiment, the present invention provides a method for entering multiple waypoint and procedure identifiers at once within a single a flight plan entry field. In another embodiment, the present invention provides for the partial entry of any waypoint or procedure identifiers, and thereafter relating the identifiers with the FMS navigation database to allow the system to anticipate the text entry. In yet another embodiment, the present invention discloses a method to automatically provide the aircraft operator with prioritized arrival and approach routing identifiers by a single manual selection thereby resulting in a minimum of operator heads-down time.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures further illustrate the present invention and, together with the detailed description of the invention, serve to explain the principles of the present invention.

Figure 1:
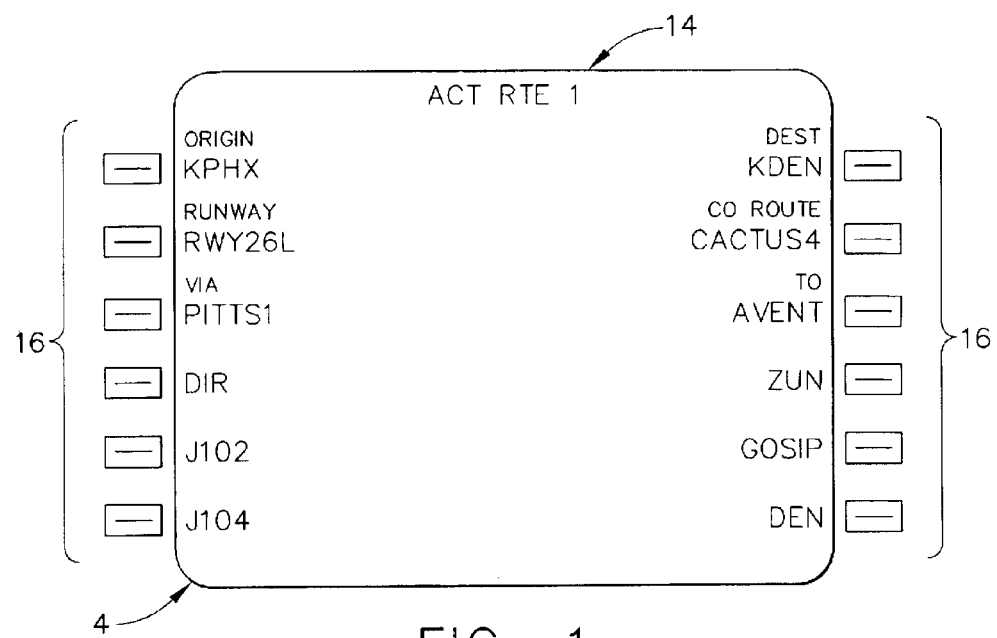
FIG. 1 depicts a representative prior art control display unit having line select keys.

As will be recognized by those of skill in the art, the present invention can be implemented in existing CDU or MCDU-based flight management systems or newer flight management systems having a graphical interface.

DETAILED DESCRIPTION OF THE INVENTION

Systems and methods in accordance with various aspects of the present invention provide an improved interface for display and editing of aircraft flight-plan data. In this regard, the present invention may be described herein in terms of functional block components and various processing steps. It should be appreciated that such functional blocks may be realized by any number of hardware, firmware, and/or software components configured to perform the specified functions.

For example, the present invention may employ various integrated circuit components, such as memory elements, digital signal processing elements, look-up tables, databases, and the like, which may carry out a variety of functions under the control of one or more microprocessors or other control devices. Such general techniques and components that are known to those skilled in the art are not described in detail herein.

It should further be understood that the exemplary process or processes illustrated may include more or less steps or may be performed in the context of a larger processing scheme. Furthermore, the various flowcharts presented in the drawing figures are not to be construed as limiting the order in which the individual process steps may be performed.

Figure 2:
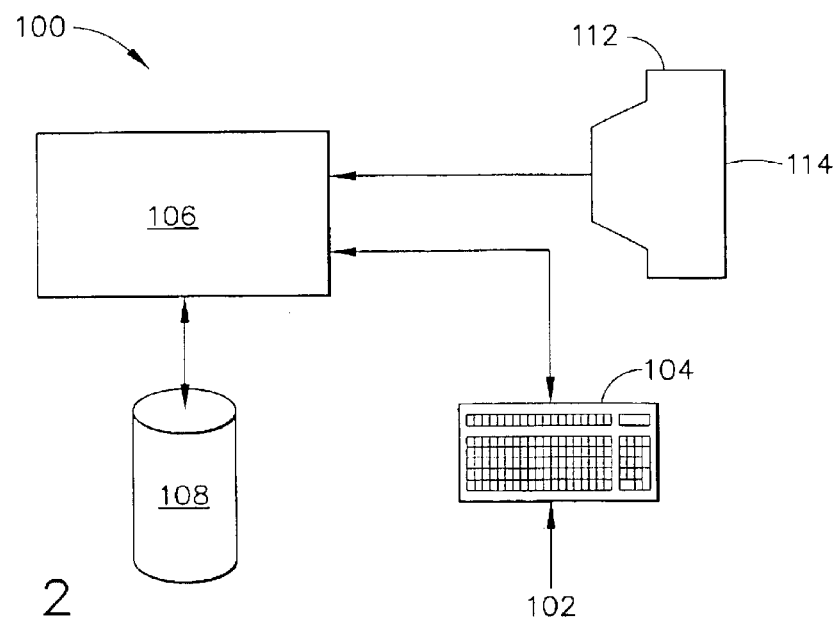
FIG. 2 is a block diagram illustrating one embodiment of the present invention.

Referring to FIG. 2, a system 100 in accordance with various aspects of the present invention is presented. System 100 comprises a processor 106 configured to communicate with an associated monitor (or monitors) 112, one or more navigational or avionics data sources 108 and text entry device 104. In general, a user or operator 102 (e.g., a pilot) located within the aircraft (not shown) provides input to processor 106 through text entry device 104 and receives visual feedback via a display 114 produced by monitor 112. Display 114 may be a CDU, MCDU or a graphical display, and further may include various information such as textual identifiers associated with the aircraft's regional airways, waypoints and procedures as determined from avionics data and/or navigational data sources 108. Through use of the text entry device 104, user 102 may modify the flight-plan and/or other such indicia graphically in accordance with visual feedback provided by display 114.

Text entry device 104 includes any device suitable to accept alphanumeric character input from user 102 and convert that input to alphanumeric text on display 114 (including keyboards, key pads, trackballs, knobs and other devices known in the art). Monitor 112 may include any display monitor suitable for displaying the various symbols and information associated with an aircraft's airways, waypoints or procedures. Many currently known monitors are suitable for this task, including various CRT and flat-panel display systems. Processor 106 encompasses one or more functional blocks used to provide control and calculation of typical flight management systems, including communicating with the text entry device 104 and monitor 112. In this regard, processor 106 may include any number of individual microprocessors, memories, storage devices, interface cards, and other standard components known in the art.

Data sources 108 include various types of data required by the system, for example, state of the aircraft data, flight plan data, data related to airways, waypoints and associated procedures (including arrival and approach procedures) navigational aids (Navaids), symbol textures, navigational data, obstructions, font textures, taxi registration, special use airspace, political boundaries, communication frequencies (enroute and airports), approach info, and the like.

Figure 3:
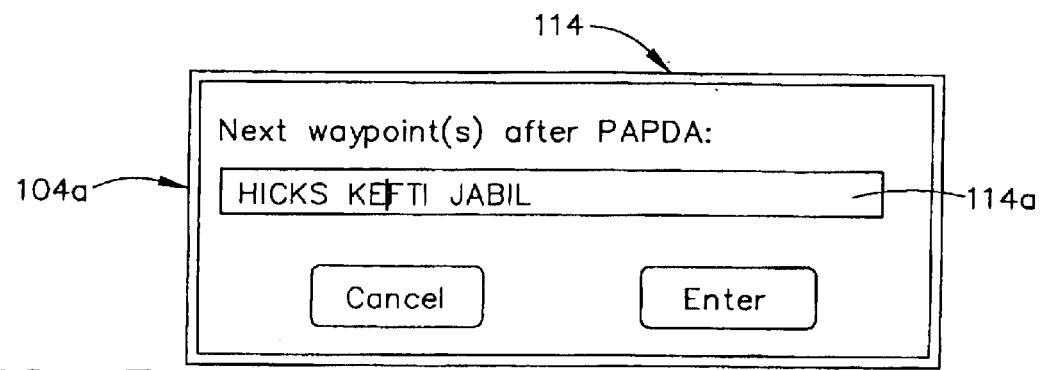
FIG. 3 depicts an exemplary flight plan entry field.

One embodiment of the present invention is illustrated in FIG. 3. In this embodiment, the operator is allowed to enter at least one text identifier 104a (which may correspond to, for example, a waypoint, an airway or a procedure) in the text entry device 104. The text identifier 104a, through processor or computer means 106, is displayed on a single flight plan entry field 114a on display 114 as seen in FIG. 3. The text identifier 104a is entered by a keyboard, keypad or like text entry device 104 which is in communication with the flight plan entry field through the computer means 106. In like fashion, the computer 106 is in communication with data sources 108 such as a computer database having stored navigation data.

The flight plan entry field may either be implemented within a conventional CDU or MCDU system, or may be implemented within a graphical display. In this embodiment, multiple text identifiers can be entered into a single flight plan entry field 114a. Once the flight plan entry field 114a contains the desired completed text (e.g., corresponding to a waypoint, airway or procedure), the operator can accept the entry, cancel the entry or begin entering the next identifier. In a text-based flight management system which includes a CDU or MCDU, the operator can accept the entered text by pressing a line select key (such as item 16 shown in FIG. 1). In to graphically oriented flight management systems, the operator can accept or cancel the entered text by use of a cursor control device or by the keyboard 104. When the operator cancels the change, the computer 106 controls the display 112 to discard the entered text identifier and wait for the next action (e.g., enter a new text identifier). When the operator accepts the change, the computer 106 controls the display 112 to display the new text identifier, and the computer 106 modifies the aircraft's flight-plan such that the new flight-plan rejoins the previous flight-plan stored in the flight management system or results in a "hole" or disconnect in the flight plan (appropriate in some circumstances). This embodiment provides the advantage of reducing the number of keystrokes required to enter multiple waypoints into the aircraft's FMS.

In another embodiment of the present invention as illustrated in FIGS. 3a–3c, as the operator enters the initial text identifier 104a on the keyboard, the computer means 106 controls the display 114 to display the character typed in the flight plan entry field 114a and also compares the entered character against the first character of known text identifiers previously stored within the database 108.

Figure 4A:
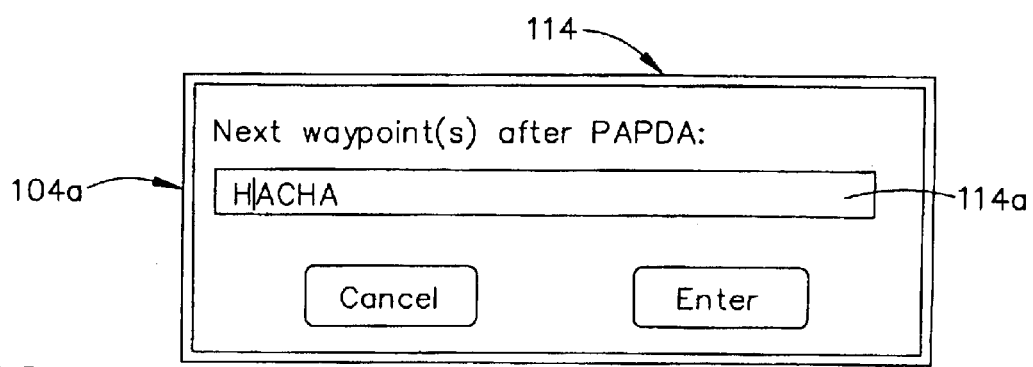
FIG. 4a depicts an exemplary flight plan entry field with a completed likely text indentifier after selecting the letter "H"
Figure 4B:
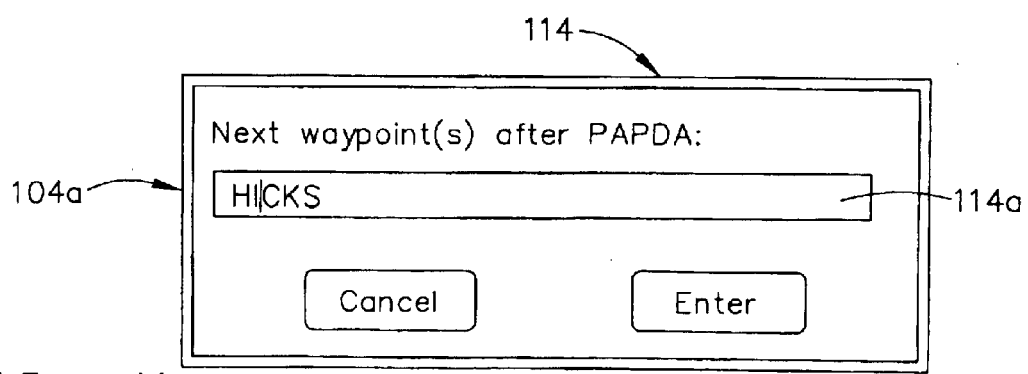
FIG. 4b depicts an exemplary flight plan entry field with a completed likely text identifier after selecting the letters "HI"
Figure 4C:
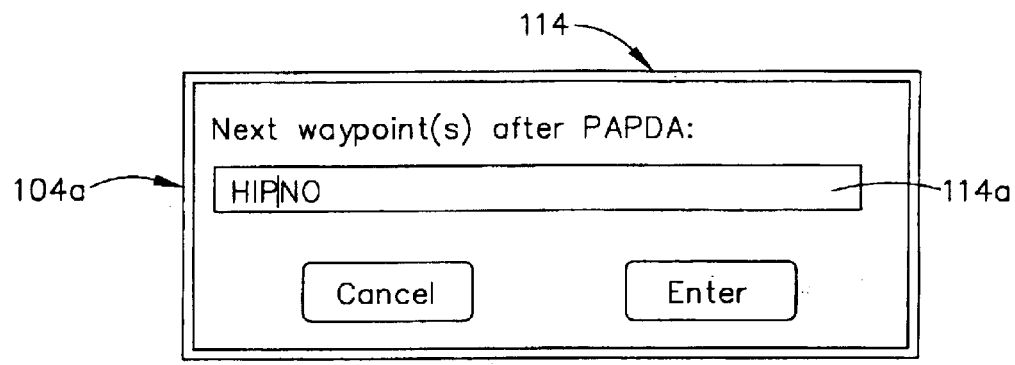
FIGS. 4c depicts an exemplary flight plan entry field with a completed likely text identifier after selecting the letter "HIP"

Based on locating similar text entered, the computer means selects the most likely text identifier 104a from the database that matches that letter and automatically displays a complete text identifier 104a in the flight plan entry field 114a. Thus, as seen in FIG. 4a, if an operator enters the text "H,", the computer means 106 searches data source 108 for the likely text identifier and controls the display 114 to display the complete, likely text identifier. As the aircraft operator enters additional text identifiers 104a into the flight plan entry field 114a (such as seen in FIGS. 4b and 4c), the computer 106 continues to compare the entered characters typed against those corresponding sequential text identifiers previously stored within the database 108. Based on locating similar text characters, the computer means 108 selects the most likely complete text identifier 104a from the database that matches the letters entered and automatically refreshes the complete text identifier in the flight plan entry field 114a as seen in FIGS. 3b and 3c. This process may otherwise be known as smart text entry or automatic complete text entry into a flight plan entry field.

Figure 4D:
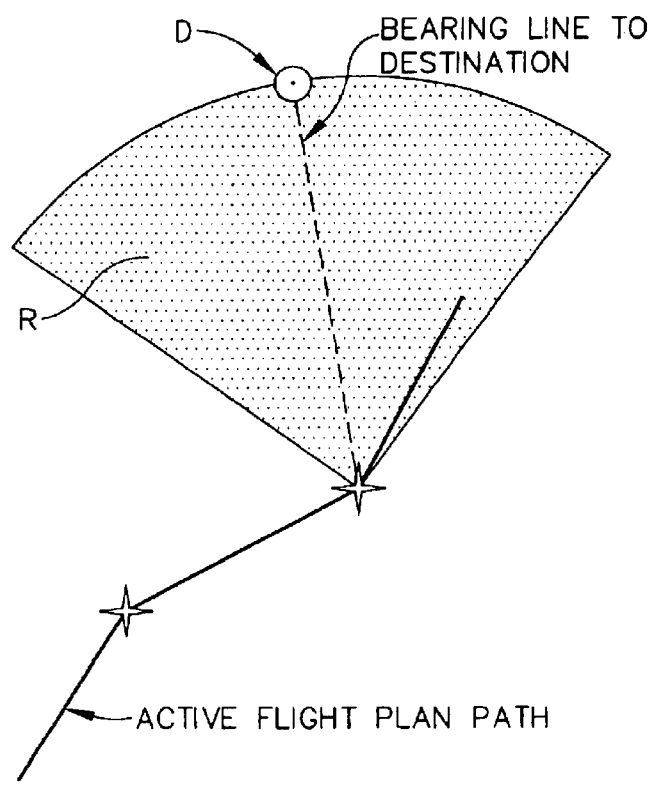
FIG. 4d illustrates an exemplary waypoint region R considered to be within the general direction of destination D.

Once the flight plan entry field 114a contains the desired text (e.g., corresponding to a waypoint, airway or procedure), the operator can either accept the entry or begin entering the next identifier 114a. In older text-based flight management systems which includes a CDU or MCDU, the operator can accept the entered text by pressing a line select key (such as item 16 shown in FIG. 1). In newer graphically oriented flight management systems, the operator can accept the entered text by a cursor control device or by the keyboard 104. In each case, the computer means determines that the most likely waypoint or text identifier is the identifier that is geographically closest to the previous flight plan waypoint and that lies in the general direction of the destination. For example, in one embodiment illustrated in FIG. 4d, a point that approximately lies in region R is considered to be within the general direction of the destination D. Those of skill in the art will realize that other means of determining the most likely waypoint in the general direction of the destination exist, and may be based on such factors as customer requirements or geographical relationship to the approach and arrival procedures available at the destination airport D. Thus, when the operator accepts the change, the aircraft's flight-plan is modified such that the new flight-plan rejoins the previous flight-plan stored in the flight management system or results in a "hole" or disconnect in the flight plan (appropriate in some circumstances).

The multiple entry feature of this embodiment permits the aircraft operator to focus on the task of appropriately routing the aircraft instead of focusing on applying the correct semantic text of the waypoint, procedure or airway entry. Again, those of skill in the art will realize that this embodiment may be implemented in either conventional text-based flight management systems or graphically-oriented flight management systems.

In most airports throughout the world, the government has assigned certain approach routes, arrival routes and landing routes for each runway available. This information is generally known to those of skill in the art. In operation, an aircraft's FMS is programmed with an initial approach, arrival and landing route. However, as the aircraft approaches an airport, it is possible that the aircraft operator may determine that the current approach and arrival route is not appropriate. Alternatively, due to weather conditions or high air traffic, the local air traffic controller may direct the aircraft to fly to a different approach, arrival and landing route.

As such, other embodiments of the present invention is directed towards those periods of time when the aircraft is approaching an airport and preparing for arrival and landing. This period is critical to an aircraft operator as many functional checks must be performed prior to the aircraft's approach, arrival and landing. During this period, an aircraft operator should preferably minimize the time it takes to manually enter text identifiers into the flight plan entry field 114a. This time period is especially critical during times when the pilot must make changes to the aircraft's arrival and approach path due to various factors including weather or air traffic control requirements. As such, this embodiment provides a method for presenting acceptable options to the operator for the appropriate arrival and approach of the aircraft.

Figure 5:
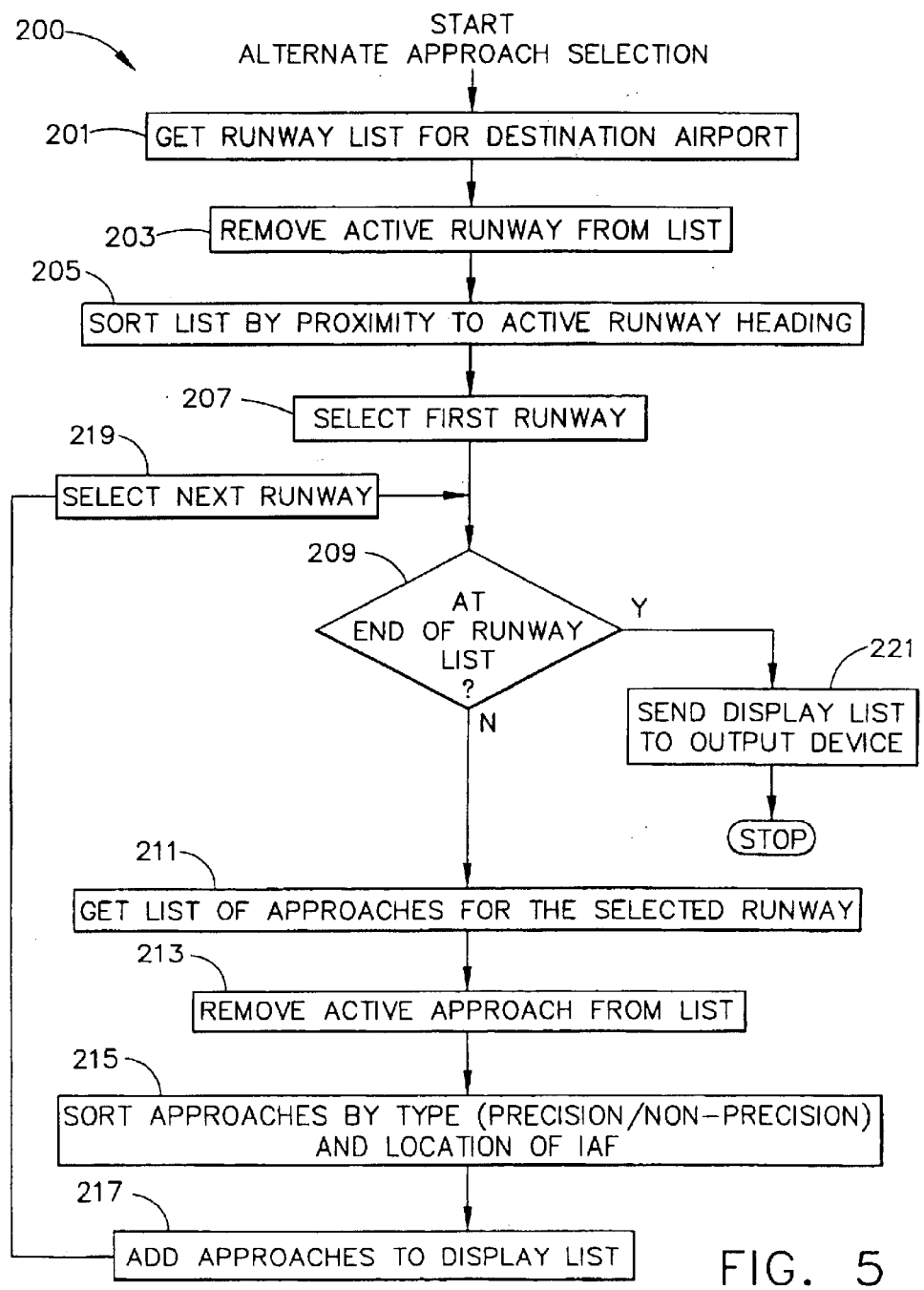
FIG. 5 illustrates an exemplary decisional process or method for presenting acceptable options to the aircraft operator for selectable alternate runway and runway-related information.

The process of this embodiment 200 is illustrated in FIG. 5. When an aircraft must modify its approach and arrival route, the operator notifies the computer means 106. The computer means then obtains a runway list from the data source 108 for all runways associated with the destination airport (201). The computer means then removes the active (or currently selected) runway information from the runway list (203), and proceeds to sort and list all remaining runways by proximity to the active (or currently selected) runway heading (205). Examining the remaining runway list, the computer means 106 then selects the most likely runway (207) for the aircraft's new approach and arrival route. While identifying alternate runways by process step 207 is preferably based on proximity to the active or currently selected runway, it may also include identification by other methods known to those of skill in the art.

Next, the computer means determines whether additional runways exist from the runway list (209). If not, the information corresponding to the most likely runway (selected in step 207) is then displayed to an output device such as monitor 112 (step 221). If additional runways exist, the computer means 106 obtains from the data source 108 a list of approved approaches from the data source 108. On the first pass of this decisional process, an additional runway will always exist because those of skill in the art will know that single-runway airports are conventionally identified to have at least two runway headings (on opposite ends of the runway), and thus, at least two approach paths. Next, the computer means removes the a active (or currently selected) approach information from the approach list (213), and proceeds to list all remaining runways by the type of approach available for the selected runway.

Preferably, the computer means 106 generates the approach list by prioritizing those approaches by type (e.g., precision or non-precision) as seen in item 215. Some precision approaches include (in order of preference based on United States airport systems, but which may change according to geographical location) instrument landing system (ILS), microwave landing system (MLS), satellite landing system (SLS), localizer-type Directional Aid (LDA) with Glideslope and localizer backcourse (LOC-BS) with Glideslope. Some non-precision approaches may include Vocalizer (LOC), localizer backcourse (LOC-BS), global positioning system (GPS), VHF Omni-directional Range (VOR), area navigation (RNAV), non-directional beacon (NDB), simplified directional facility (SDF) and long range navigation (Loran). Generally, ordering the non-precision approaches is more difficult because although some (like SDF) provide superior lateral guidance, they are also relatively rare, relegating them to a lower position on the list.

The determination as to which approaches are the most likely candidates to be used in place of the active approach is based upon the type of approach (precision or non-precision) and the location of the Initial Approach Fix (IAF) in relation to the planned lateral path of the airplane. In a congested terminal environment, it is possible to have the controller instruct the aircraft to land on a parallel runway at some point in the approach. Less likely, but also possible, is for the aircraft to be instructed to land on a different runway that is aligned similarly to the flight planned runway. Least likely of all would be an aircraft landing approach from the opposite direction (e.g. the other side or far end of the runway).

If a late clearance to an alternate runway or approach is issued, there is typically little time to re-program the aircraft's flight management system to accept the new approach coordinates. Changes to the methods employed by the FMS to string the new approach and determine its relationship to the aircraft's current position will minimize the keystrokes and time required to make the change. Usually, it is possible to anticipate the coordinate or approach changes because the approach is changed to an adjacent or parallel runway. However, this method is not always absolute because air traffic control may change the direction of the landing due to various reasons such as the change of weather. Thus, while these alternate approach and arrival procedures are less likely to occur, such procedures are still possible.

Once sorting by type is achieved, the computer means stores an approach type list (217) and proceeds to select the next runway (219). If no further runways exist, the information corresponding to the most likely runway (selected in step 207) and its corresponding approach types (generated in 215/217) is then displayed to an output device such as monitor 112 (step 221). Preferably, the computer means 106 is configured to accept input from the user to display each runway and its associated approach values adjacently, or alternatively, the computer means is configured to display only runway information. This graphic approach may be useful for pilots approaching large airports which have multiple runways, multiple approach and arrival options and thus, require a large amount of information to be displayed. In either situation, the aircraft operator is automatically provided with alternative approach and arrival procedures which can be easily selected.

Figure 6:
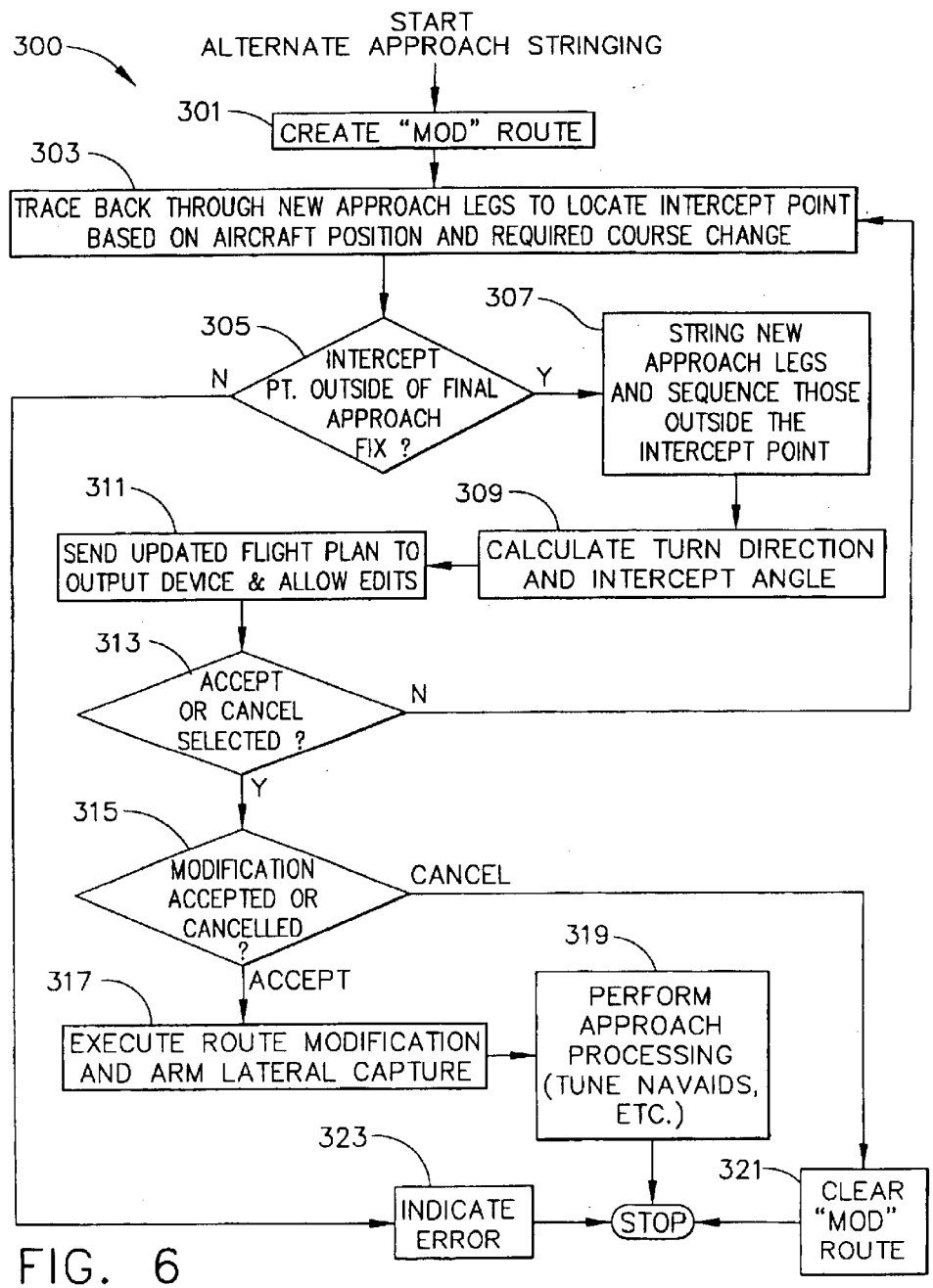
FIG. 6 illustrates an exemplary decisional process or method for presenting acceptable options to the aircraft operator for selectable alternate approach and arrival routes for the aircraft.

The process of another embodiment 300 of the present invention is illustrated in FIG. 6. When an aircraft must modify its approach and arrival route, the operator notifies the computer means, which optionally creates a backup copy of the active (or currently selected) flight plan (301). The computer means 106 then communicates with the FMS and the database 108 to trace the legs associated with the new alternate approach and also determine a new intercept point along the new alternate approach based on aircraft position and distance to the new runway coordinates (303). If the calculated intercept point is within the final approach fix as questioned in 305 (which may indicate, for example, that the intercept point is too close to the runway for an appropriate landing), the computer means 106 controls the monitor 112 to display an error (323). If the intercept point is located outside of the known final approach fix for the new alternate approach, the computer means 106 obtains the new legs associated with the new alternate approach and deletes those waypoints or paths along the leg which the aircraft has already passed (307). With this information, the computer means then calculates an appropriate turn direction and intercept angle for the aircraft to achieve the new intercept point (309) in the new alternate approach and controls the monitor 112 to display the new alternate approach (311).

At this point, the user can accept the new alternate approach, cancel the new alternate approach or do nothing at all (313). The operator may select or cancel the new alternate approach by, for example, selecting the appropriate key on a keypad 104 or by other methods known in the art. If the operator does nothing (which may occur, for example, when the operator is too busy or otherwise decides not to proactively accept the new alternate approach), the computer means repeats steps 303 through 313 until the operator proactively accepts or cancels the new alternate route. This repetition is necessary because the aircraft is still continuing to fly the active (or currently selected) flight plan, and thus, the new alternate approach intercept point will continue to change.

If the operator accepts or cancels the new alternate approach (315), the computer means 106 then replaces the active (or currently selected) flight plan (301) with the new alternate approach in the FMS and executes conventional approach processing (317/319) based on the new alternate approach data. In this fashion, the aircraft operator is automatically provided with continuous alternative approach and arrival procedures which can be easily selected by the operator.

The advantages to various embodiments of the present invention are many. For example, the present invention reduces the total number of manual keystrokes and time required to make a flight path plan entry. Further, text entries can be entered by the operator as the new commands are received by air traffic control, thereby substantially reducing or eliminating the need to log such entries on paper. Further, entered text can be quickly verified for entry into the flight management system. The present invention provides the operator with anticipated text entries or flight plan paths which may correspond to previously stored navigation identifiers or flight plan paths. Further, text matches are automatically determined based on the direction to the final destination and distance from the previous waypoint (and not on other waypoints, airways or procedures which do not relate to the present flight plan).

The present invention provides a simple yet intuitive user interface for the entry and editing of flight plan data on aircraft flight management systems. Although some of the embodiments described illustrate the invention being used with a graphical display, those of skill in the art will recognize that it is equally applicable to conventional CDU or multifunction control and display unit (MCDU) interfaces which are mainly text-based. Further, those of skill in the art will realize that while the various embodiments may be integrated into the same flight management system, each embodiment may work independently of the other embodiments disclosed.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a method and system for entering data within a flight pan entry field, is followed.

What is claimed is:

1. A method for entering data into an aircraft flight management system having a computer, the computer communicating with a monitor, at least one data source and a text entry means, the method comprising the steps of:
   a. entering at least one alphanumeric character corresponding to a first text identifier into the text entry device and displaying the text entered on a flight plan entry field on the display;
   b. comparing the entered chat to data stored in each data source and identifying and automatically completing on the monitor display a likely text identifier that is geographically closest to the aircraft's flight plan; and
   c. repeating steps a and b until a desired first text identifier is displayed in the flight plan entry field,
   d. accepting the text identifier by the text entry means if acceptable to an operator of the aircraft and allowing the computer to modify the aircraft's flight plan corresponding to the accepted text identifier,
   e. entering at least one alphanumeric character corresponding to additional text identifiers into the text entry device and displaying the text entered on a flight plan entry field on the display,
   f. comparing the entered character to data stored in each data source and identifying and automatically completing on the monitor display a likely text identifier that is geographically closest to the aircraft's flight plan,
   g. repeating steps e and f until a desired additional text identifier is displayed in the flight plan entry fields,
   h. notifying the computer by the text entry means to allow the computer to obtain a runway list from the data source for all runways associated with a destination airport; and
   i. removing active runway information from the runway list and sorting and listing all remaining runways by proximity to the active runway heading.

2. The method of claim 1 wherein at least one data source contains avionics data.

3. The method of claim 2 wherein at least one data source contains navigational data.

4. The method of claim 3 wherein the computer is a microprocessor.

5. The method of claim 4 wherein each text identifier is selected from the group consisting of airway data, waypoint data and aircraft procedure data.

6. The method of claim 1 further comprising the steps of:
   j. allowing the computer to select the most likely runway corresponding to the aircraft's new approach and arrival route;
   k. determining whether additional runways exist in the runway list;
   l. if no additional runways exist in the runway list, displaying the runway list to an output device;
   m. if additional runways exist in the runway list, allowing the computer to generate an approved approach list tom the data source;
   n. removing, by the computer, the active approach information from the approach list;
   o. prioritizing all remaining runways by the type of approach available for the selected runway and allowing the computer to store an approach list.

7. A process for presenting acceptable options to an aircraft operator for selectable alternative runway and approach paths, the aircraft having an aircraft avionics flight management system (FMS) having a computer means, the computer means communicating with a monitor, at least one data source and a text entry means, the process comprising the steps of:
   a. notifying the computer means by the text entry means to allow the computer means to obtain a runway list from the data source for all runway associated with a destination airport programmed within the FMS;
   b. removing active runway information from the runway list and sorting all remaining runways by proximity to the active runway heading;
   c. allowing the computer means to select the most likely runway corresponding to the aircraft's new approach and arrival route and displaying;
   d. determining whether additional runways exits in the runway list;
   e. if additional runways exist in the runway list, displaying the runway list to an output device;
   f. if additional runways exist in the runway list, allowing the computer means to generate an approved a list from the data source;
   g. removing, by the computer means, the active approach information from the approach list;
   h. prioritizing all remaining runways by the type of approach available for the selected runway and allowing the computer means to store an approach list; and
   i. repeating steps e–h.

8. The process of claim 7 wherein the output device is a monitor.

9. The process of claim 7 wherein the data source includes navigation and avionics information.

10. The process of claim 9 wherein the step of prioritizing all remaining runways by the type of approach further includes the step of prioritizing all remaining runways by precisional information.

11. The process of claim 10 wherein precisional information is selected from the group consisting of instrument landing system, microwave landing system, satellite landing system, localizer-type directional aid with Glideslope and localizer backcourse with Glideslope information.

12. The process of claim 10 wherein the step of prioritizing all remaining runways by the type of approach further includes the step of prioritizing all remaining runways by non-precisional information.

13. The process of claim 12 wherein non-precisional information is selected from the group of localizer, localizer backcourse, global positioning system, very high frequency omni-directional range, area navigation, non-directional beacon, simplified directional facility and long range navigation information.

14. The process of claim 13 further including the steps of:
   a. notifying the computer means by the text entry means to determine all legs associated with a new alternate approach associated with a new runway and further having a new intercept point along the new alternate approach;
   b. if the intercept point is within the new runway's final approach, allowing the computer means to control an output device to display an error message;
   c. if the intercept point is not within the new runway's final approach fix, allowing the computer means to control the monitor to display an error message;
   d. if the intercept point is located within the new runway's final approach fix, allowing the computer means to obtain a new leg corresponding to the new alternate approach and to delete waypoints along the leg which the aircraft has passed;
   e. allowing the computer means to calculate a proposed turn direction and intercept angle for the aircraft to achieve the new intercept point in the new alternate approach and controlling the monitor to display the new alternate approach;
   f. repeating steps a–e until the operator accepts or cancels the new alternate approach;
   g. if the operator accepts the new alternate approach, allowing the computer means to replace the active flight plan with the new alternate approach in the FMS and executing the new alternate approach.

15. A process for presenting at least one new alternate approach pattern to a new runway to an aircraft operator for selection, the aircraft having an aircraft avionics flight management system (FMS) having a computer means, the computer means communicating with a monitor, at least one data source and a text entry means, the process comprising the steps of:
   a. notifying the computer means by the text entry means to determine all legs associated with the new alternate approach and a new intercept point along the new alternate approach;
   b. if the intercept point is within the new runway's final approach, allowing the computer means to control an output device to display an error message;
   c. if the intercept point is not within the new runway's final approach fix, allowing the computer means to control the monitor to display an error message;
   d. if the intercept point is located within the new runway's final approach fix, allowing the computer means to obtain a new leg corresponding to the new alternate approach and to delete waypoints along the leg which the aircraft has passed;
   e. allowing the computer means to calculate a proposed turn direct and intercept angle for the aircraft to achieve the new intercept point in the new alternate approach and controlling the monitor to display the new alternate approach,
   f. repeating steps a–e until the operator accepts or cancels the new alternate approach;
   g. if the operator accepts the new alternate approach, allowing the computer means to replace the active night plan with the new alternate approach in the FMS and executing the new alternate approach.

16. The process of claim 15 wherein the step of determining all legs associated with the new alternative approach and a new intercept point along the new alternate approach is based on aircraft position and aircraft distance to the new runway coordinates.

17. A method for entering data into an aircraft flight management system having a computer, the computer communicating with a monitor, at least one data source and a text entry means, the method comprising the steps of:
   a. entering at least one alphanumeric character corresponding to a first text identifier into the text entry device and displaying the text entered on a flight plan entry field on the display;
   b. comparing the entered character to data stored in each data source end identifying a likely text identifier that is geographically closest to the aircraft's flight plan; and
   c. accepting the text identifier by the text entry means if acceptable to an operator of the aircraft and allowing the computer to modify the aircraft's flight plan corresponding to the accepted text identifier,
   d. notifying the computer by the text entry means to allow the computer to obtain a runway list from the data source for all runways associated with a destination airport; and
   e. removing active runway information from the runway list and sorting and listing all remaining runways by proximity to the active runway heading.

* * * * *